United States Patent

Lorenz

[11] Patent Number: 6,026,571
[45] Date of Patent: Feb. 22, 2000

[54] METHOD OF CONNECTING A STEM TO A BASE OF AN ARTICLE OF JEWELRY

[75] Inventor: Jeff Lorenz, Richmond, Calif.

[73] Assignee: Industrial Strength Corporation, Richmond, Calif.

[21] Appl. No.: 08/954,570

[22] Filed: Oct. 20, 1997

[51] Int. Cl.[7] ................................. B21D 39/00
[52] U.S. Cl. .................. 29/896.41; 156/293; 156/303.1; 63/DIG. 3; 63/35
[58] Field of Search ................... 63/12, 13, 26, 63/35, DIG. 3; 411/180, 107, 396, 397, 383, 389, 387; 29/896.4, 432.2, 896.41, 432, 432.1; 156/293, 309.6, 309.9, 308.4, 303.1

[56] References Cited

U.S. PATENT DOCUMENTS

| | | |
|---|---|---|
| 824,983 | 7/1906 | Farrington ........................ 411/397 X |
| 878,616 | 2/1908 | Dover ................................. 29/896.41 |
| 1,114,998 | 10/1914 | Love . |
| 1,884,491 | 10/1932 | Ziemann ........................... 411/180 X |
| 2,052,616 | 9/1936 | Gardes ............................... 156/303.1 |
| 3,180,112 | 4/1965 | Lefkowitz . |
| 3,184,353 | 5/1965 | Balamuth et al. ................ 156/303.1 |
| 3,207,023 | 9/1965 | Knohl ................................ 411/387 |
| 3,284,258 | 11/1966 | Patti et al. ........................ 156/293 |
| 4,044,725 | 8/1977 | Miller ............................... 63/DIG. 3 X |
| 4,401,388 | 8/1983 | Mearns ............................. 63/3 X |
| 4,488,345 | 12/1984 | Müller et al. .................... 156/303.1 |
| 4,723,421 | 2/1988 | Nitsche ............................. 63/12 |
| 5,115,649 | 5/1992 | Amber . |
| 5,157,945 | 10/1992 | Giehl ............................... 63/2 |
| 5,218,839 | 6/1993 | Udko . |
| 5,271,785 | 12/1993 | Devine ............................. 156/293 |
| 5,409,486 | 4/1995 | Reese ............................... 411/397 X |
| 5,415,507 | 5/1995 | Janusz et al. ................... 411/383 X |
| 5,437,166 | 8/1995 | Gardner .......................... 63/12 |
| 5,577,396 | 11/1996 | Cannon . |
| 5,660,060 | 8/1997 | Catanzaro ....................... 63/12 |
| 5,824,181 | 10/1998 | Salyer et al. ................... 29/714 |

FOREIGN PATENT DOCUMENTS 1542918  3/1979  United Kingdom ................. 63/12

*Primary Examiner*—P. W. Echols
*Attorney, Agent, or Firm*—Theodore J. Bielen, Jr.

[57] ABSTRACT

An article of jewelry utilizing a base of heat deformable material. The base is formed with an aperture or bore which extends partially through the base. The aperture terminates in a floor within the base and is surrounded by a cavity at the surface of the base. An elongated member of heat retaining material extend within the aperture of the base and penetrates the floor of the same. A holder connects to the elongated member and includes an end portion which fits in the cavity of the base.

11 Claims, 1 Drawing Sheet

U.S. Patent    Feb. 22, 2000    6,026,571
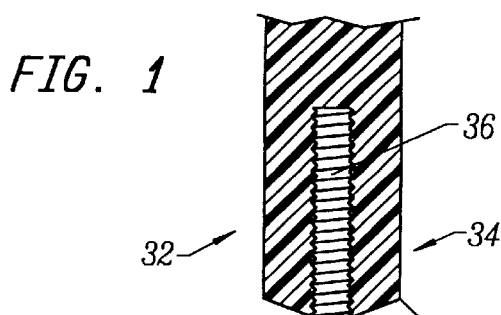
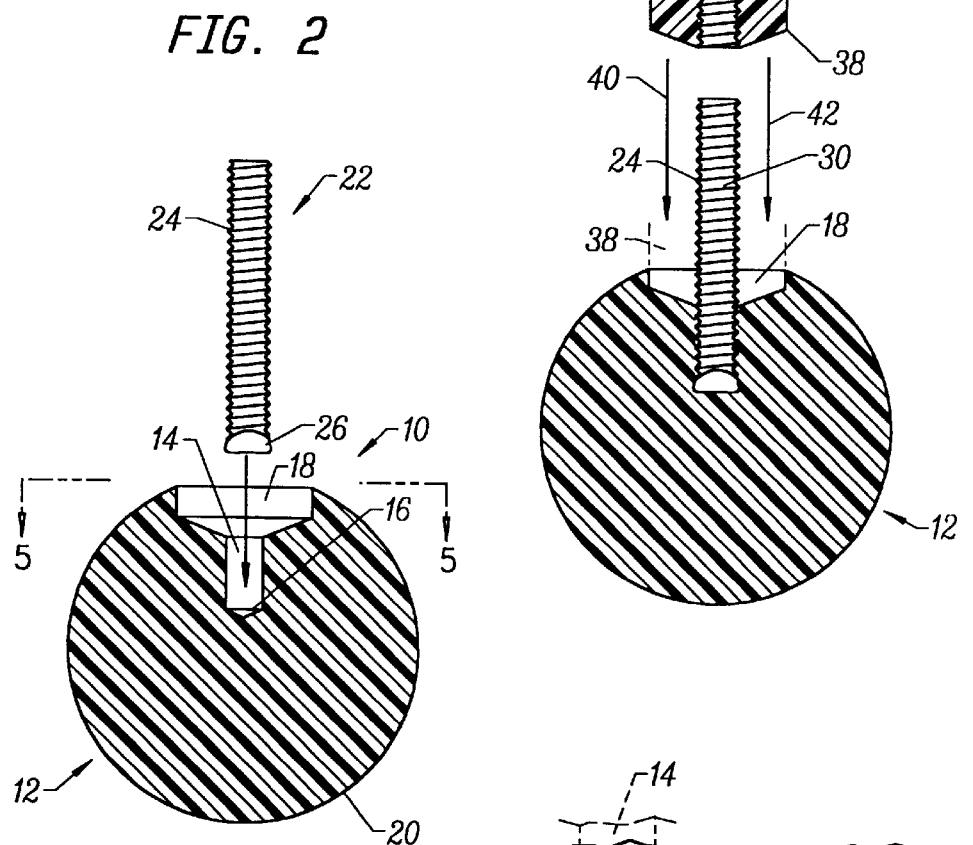
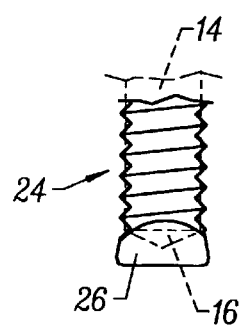
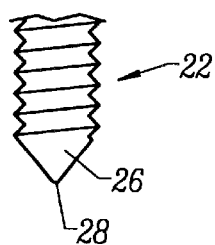
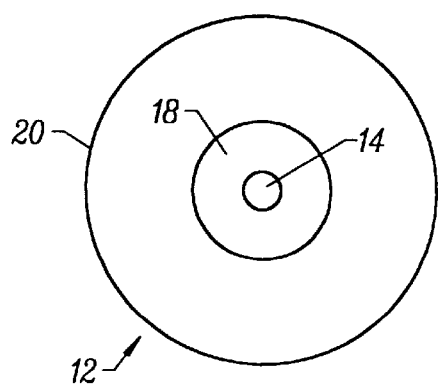
FIG. 1
FIG. 2
FIG. 3
FIG. 4
FIG. 5

METHOD OF CONNECTING A STEM TO A BASE OF AN ARTICLE OF JEWELRY

BACKGROUND OF THE INVENTION

The present invention relates to a novel article of jewelry and a process for assembling the same.

Decorative items, such as jewelry, have been manufactured employing plastic type materials of various shapes and sizes. Normally the decorative article must be attached to a carrier, holder, or another article of jewelry to produce a finished piece. In the past, the connection of the decorative plastic article to the carrier entailed the use of adhesives or complicated mechanical linkages. Although successful in providing an article of jewelry interconnected to a carrier, the prior art methods and techniques are expensive and time consuming.

Prior articles of jewelry have been proposed, such as that shown in U.S. Pat. Nos. 5,115,649 and 5,218,839, which entail jewelry settings for diamonds. Such settings included base portions that have particular cuts to hold the diamond in place.

U.S. Pat. Nos. 1,114,998 and 3,180,112 depict mechanical holders for jewelry having settings that permit interchangability of the same through mechanical locking mechanisms.

U.S. Pat. No. 5,577,396 depicts a convertible stud jewelry in which an ornamental piece is threaded into a threaded stud for use as an earring.

An item of jewelry connectable to a carrier would be a notable advance in the field of decorative articles.

SUMMARY OF THE INVENTION

In accordance with the present invention a novel and useful article of jewelry is herein provided.

The article of jewelry of the present invention is used in connection with a carrier, which may be another piece of jewelry, a clasp, a clip, and the like. The article of jewelry of the present invention utilizes a base which is composed of heat deformable material such as a plastic. The base possesses an aperture which extends partially into the base. The aperture is, thus, formed with a floor. Surrounding the aperture surface of the base is a cavity, counter-sink, or indent. The indent is intended to accommodate or fit the end of the carrier used in connection with the article of jewelry.

An elongated member of heat retaining material is also utilized in the present invention. The elongated member possesses an end which is capable of penetrating the floor of the aperture of the base. Such penetration takes place during the heat deformation of the base. The elongated member is held to the base after hardening of the base member through a cooling step. The elongated member may be further formed with a sharpened, chiselled, or beveled edge. After positioning within the base below the floor of the aperture, the chiselled end of the elongated member resists rotation and, subsequent loosening or removal from the aperture of the elongated member. In this regard, the elongated member may be a threaded member, in whole or in part.

Connection means is also present in the present invention for fixing the elongated member to the carrier. Such connection means may take the form of providing the carrier with a threaded aperture to threadingly engage the threaded portion of the elongated member. In addition, the cavity or indent found on the base would accommodate the end of the carrier to provide a snug fit between the carrier and the base.

The invention may also be deemed to include a process for assembling an article of jewelry to a holder having an end portion by providing a base of heat deformable material with an aperture extending partially into the same. The aperture is provided with a floor and a cavity or indent about the aperture on the surface of the base. The elongated member composed of heat retaining material and having an end is then heated and placed within the aperture to penetrate the floor of the aperture. Such penetration takes place due to the heating and deformation of the base. After cooling, the elongated member and base are fixed to one another. The elongated member is then connected to the holder such that the end of the holder fits within the cavity formed in the base member.

It may be apparent that a novel and useful article of jewelry and process for assembling an article of jewelry is herein provided.

It is therefor an object of the present invention to provide an article of jewelry and a process for assembling an article of jewelry in which the use of adhesives has been completely eliminated.

It is another object of the present invention to provide an article of jewelry and a process for assembling an article of jewelry in which the article of jewelry snugly fits to a carrier, which may be in the form of another jewelry portion.

A further object of the present invention is to provide an article of jewelry and a process for assembling an article of jewelry in which a plastic base connects to a metallic elongated member in a permanent fashion, without the use of mechanical connectors.

A further object of the present invention is to provide an article of jewelry and a process for the assembly of an article of jewelry in which the article is assembled quickly, cheaply, and efficiently.

The invention possesses other objects and advantages especially as concerns particular characteristics and features thereof which will become apparent as the specification continues.

BRIEF DESCRIPTION OF THE DRAWINGS

FIG. 1 is a sectional view of the article of the present invention showing the base and elongated member in exploded configuration.

FIG. 2 is a sectional view showing the assembled article of jewelry exploded from the carrier for the article of jewelry.

FIG. 3 is a front elevational view of the end portion of the elongated member in relation to the aperture of the base which is depicted in phantom.

FIG. 4 is a side elevational view of the end portion of the elongated member depicting a chisel point.

FIG. 5 is a top plan view of the base member taken along line 5—5 of FIG. 1.

For a better understanding of the invention references made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments which should be referenced to the heretofore drawings.

The invention as a whole is depicted in the drawings by reference character 10. The jewelry article of the present invention includes as one of its elements a base 12 constructed of heat deformable material such as plastic and the like. That is to say, base 12 when heated will deform or melt and harden when such source of heat has dissipated or is removed. Base 12, depicted as a spherical item, is formed with a bore or aperture 14. Aperture 14 may be fabricated by drilling or other known processes. In the embodiment shown in FIG. 1, aperture 14 has been drilled and includes a floor 16 at the interior of base 12. Aperture 14 is countersunk to produce a cavity 18 at the surface 20 of base 12. Cavity 18 is larger than aperture 14 and surrounds aperture 14, as best shown in FIG. 2. In general, base 12 serves as an ornament for a piece of jewelry. Although shown as a spherical item, base 12 may take any shape. Of course, base 12 may serve other purposes such as an anchor for a jewelry piece.

Again referring to FIGS. 1 and 2, article includes an elongated member 22 which is formed of heat retaining material such as metal. The elongated member is shown as being fully threaded having threaded surface 24, although elongated member 22 may possess a partial threaded surface in certain cases. Elongated member 22 also possesses end 26 which is formed into a sharpened, beveled, or chisel-like tip 28. End 26 is capable of penetrating floor 16 of aperture 14 when base 12 has been heat deformed to a certain degree. Normally, elongated member 22 serves as the source for such heat and transfers the same to base 12 by conduction. Such penetration is illustrated in FIG. 3. End 26, of sharpened configuration, prevents the turning of elongated member 22 when it is embedded or has penetrated floor 16 of aperture 14 of base member 12, after cooling of base 12 and elongated member 22. In this position, end 30 of elongated member 22 extends outwardly from base 12, FIG. 2.

Connection means 32 is also depicted in the drawings for fixing elongated member 22 to holding or carrier 34. Carrier 34 may be in the form of a clasp, a link, another portion of an article of jewelry. Carrier 34 is constructed, in the embodiment shown in the drawings, with an internal threaded aperture 36, that is capable of threadingly engaging threaded surface 24 of elongated member 22. When such connection takes place, through the threading engagement hereinbefore described, carrier 34 is held to base 12 such that end portion 38 of carrier 34 fits within cavity 18 of base 12. Directional arrows 40 and 42, FIG. 2 depict such mating of carrier 34 with base 12.

In operation, article of jewelry is formed by a process in which base 12 of heat deformable material is provided with aperture 14 having a floor 16. Cavity 18 is also formed at the surface 20 of base 12 and essentially surrounds aperture 14.

Elongated member 22 is heated and placed into aperture 14 against floor 16, and forced through floor 16 to penetrate body of base 12. The elongated member 22 and base 12 are then cooled, causing elongated member to be secured to base 12. Sharpened end 26 of threaded elongated member 22 resists any rotational movement applied to elongated member 22, in this regard. Carrier 34 is then threaded to elongated member 22 such that end 38 nests within cavity 18 in a snug manner. It should be noted that sharpened end 26 of elongated threaded member may be easily formed by crimping or cutting elongated member 22 prior to heating the same.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A process for assembling an article of jewelry to a holder having an end portion comprising the steps of:

a. providing a base of heat deformable material with an aperture extending partially thereunto, said aperture having a floor, said base further comprising a cavity at least partially surrounding said aperture;

b. heating an elongated member of heat retaining material; said elongated member having an end;

c. placing the heating elongated member within said aperture of said base and forcing said end of said elongated member against said floor of said aperture to effect penetration thereof;

d. cooling said elongated member and base; and e. fixing said elongated member to the holder, such that the holder end portion fits within said cavity of said base member.

2. The process of claim 1 in which said elongated member is a threaded elongated member.

3. The process of claim 2 in which said holder includes a threaded aperture for threadingly engaging said threaded elongated member.

4. The process of claim 1 in which said end of said elongated member comprises a sharpened edge.

5. The process of claim 4 in which said sharpened edge is a beveled edge.

6. A process for manufacturing an process of jewelry, comprising:

a. providing a base of heat deformable material having an aperture extending partially into said base, said aperture further including a floor, said base further including a cavity at least partially surrounding said aperture;

b. providing an elongated member of heat retaining material having an end configuration to resist turning of said elongated member relative to said floor of said aperture;

c. applying heat to said elongated member to deform the heat deformable material of said base, and penetrating said floor of said aperture by the heated end of said elongated member; and d. removing heat from said elongated member to fix said elongated member to said base.

7. The process of claim 6 in which said end of said elongated member comprises a sharpened edge.

8. The process of claim 7 in which said sharpened edge is a beveled edge.

9. The process of claim 6 in which said base material is a plastic.

10. The process of claim 6 in which said elongated member is a threaded elongated member.

11. The process of claim 10 in which said connection means comprises a threaded aperture in the holder for threadingly engaging said threaded elongated member.

* * * * *